May 25, 1965   F. C. FORD ETAL   3,185,063
MAGNETICALLY ACTUATED SHUTTER
Filed June 12, 1962
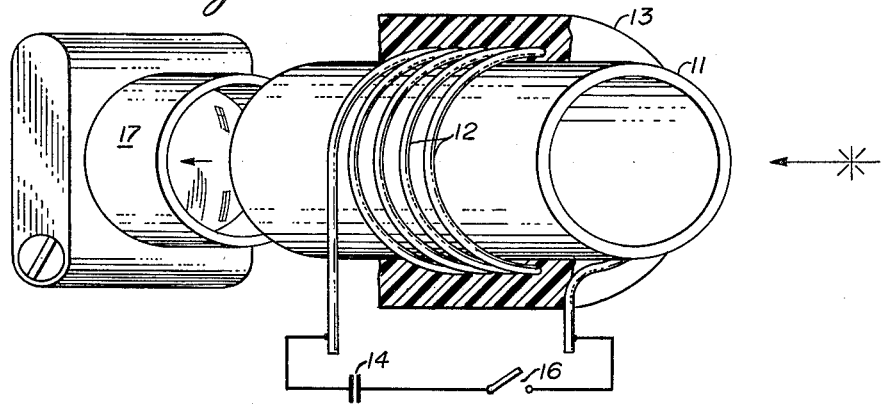
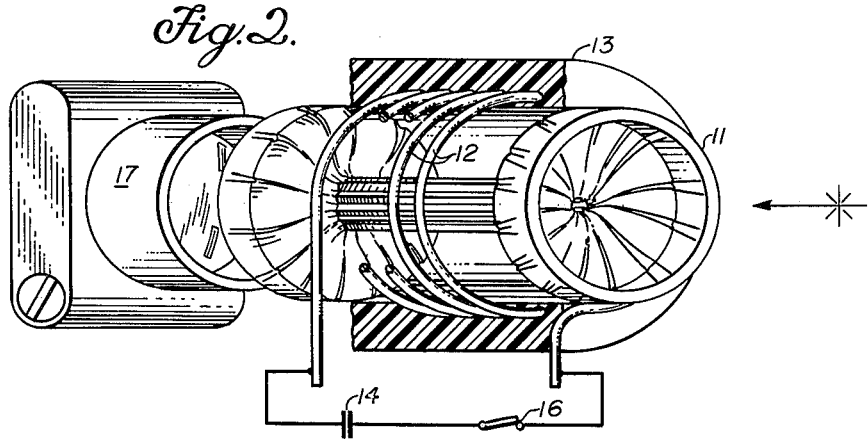
INVENTORS
FRANKLIN C. FORD
EDWIN B. NELSON
WILLIAM M. TRIMBLE
SAMUEL G. ZIZZO
BY
ATTORNEY 3,185,063
MAGNETICALLY ACTUATED SHUTTER
Franklin C. Ford, Pleasanton, Calif., Edwin B. Nelson, Albuquerque, N. Mex., and William M. Trimble and Samuel G. Zizzo, Livermore, Calif., assignors to the United States of America as represented by the United States Atomic Energy Commission
Filed June 12, 1962, Ser. No. 202,032
8 Claims. (Cl. 95—53)

The present invention relates to shutters for optical instruments and, more particularly, to a magnetically actuated shutter particularly adaptable for use with high-speed cameras.

In the art of high-speed photography, cameras have been developed which require an extremely rapid means of shuttering light to prevent over exposure or double exposure of film. For instance, many cameras today require shutters having closing times in the microsecond range.

One type of shutter commonly used to attain such closing times is the so-called "blast shutter." This type of shutter utilizes a small explosive charge to either spread a suitable opaque material over the face of a window, or else to internally shatter a window and thus render it opaque. However, this type of shutter has many disadvantages. The most serious of these being the necessity of interposing at least one window in the path of the light. The resulting attenuation and distortion of the incoming light is very undesirable for many applications. In addition, because of the explosive, the blast shutter requires careful handling. Also, chemical explosives tend to change their properties with time so that the actual speed of a blast shutter may be significantly different from the original design if the shutter has been stored for some time.

Another type of shutter that has been used to attain high-speed closing is the electro-optical or "Kerr" cell shutter. This type of shutter, however, depends upon polarization for its shuttering effect. Even when "open," an electro-optical shutter polarizes the incoming light resulting in such a series attenuation and distortion of the light that this type of shutter has been precluded from use in most applications. Further, the Kerr cell is dependent on temperature with a weakening of the Kerr effect at high temperatures. In addition, with electro-optical shutters, as well as with blast shutters, there is a limitation on the size of the shutter opening with corresponding limitations on its positioning and the size of the resulting picture.

The present invention provides a novel shutter which does not have the disadvantages inherent in the prior-art shutters, but still provides closing speeds in the microsecond range. Generally, the invention comprises an electrically conductive tube in combination with means for providing a rapidly changing magnetic field that is productive of a pressure having a direction and strength great enough to crush the tube. Preferably, a thin-walled, metallic tube is disposed within a similarly shaped solenoid connected to means for rapidly producing a high current therein. Light from the event of interest passes through the tube to an optical instrument, e.g., a light-recording means. When a high current is suddenly introduced in the solenoid, the resulting inward magnetic-field pressure crushes the tube, thus preventing the light from passing therethrough to the optical instrument.

It is readily realized that the present invention does not require polarization or the use of a window for its operation. In addition, the shutter opening may have a greater cross-sectional area than those of the prior art, and may be placed anywhere in the path of the incoming light. The shutter is relatively inexpensive, easily portable, and does not require special handling.

It is therefore a primary object of the present invention to provide a magnetically actuated, high-speed shutter for optical instruments.

Another object of the present invention is to provide a high-speed shutter for optical instruments which causes no attenuation or distortion of incoming light.

A further object of the present invention is to provide a high-speed shutter which may be placed anywhere in the path of incoming light.

One other object of the present invention is to provide a novel high-speed shutter which requires no special handling and is relatively inexpensive.

Other objects and advantages of the present invention will be apparent to those skilled in the art upon consideration of the following description with reference to the attached drawings, in which:

FIGURE 1 is an oblique elevation view of a preferred shutter of the invention in the open position; and FIGURE 2 is an oblique elevation view of the shutter of FIGURE 1 in the closed position.

Referring now to FIGURE 1, there is shown a generally cylindrical, thin-walled, conductive tube 11 disposed within a similarly shaped solenoid 12. To add rigidity to the solenoid 12, it is encased in a sleeve 13 of a nonconductive material, e.g., of plastic. A capacitor bank 14 and a firing switch 16, e.g., an ignitron, are shown schematically connected in series to the solenoid. An optical instrument 17 (partly shown) is positioned along the longitudinal axis of the tube 11. Light rays from a source are shown schematically passing through the tube to the instrument 17.

Preferably, the inner surface of the tube 11 is painted black to prevent light leakage by reflection when the shutter is in the closed position, as is shown in FIGURE 2. In addition, the tube is slightly longer than the solenoid to prevent light from passing around the ends of the tube to the instrument 17 after closing of the shutter.

To close the shutter, the firing switch 16 is closed, and the capacitor bank, which has been previously highly charged, is discharged through the solenoid 12. The sudden impulse of current in the solenoid causes a rapidly rising magnetic field which, in turn, induces eddy currents in the conductive tube 11. The direction of these induced currents is such to create a second magnetic field which opposes the increase in the solenoidal field. As a result, the magnetic-flux density in the space between the solenoid and the conducting tube reaches an extremely high value in a short time interval. Since the high-flux density does not immediately penetrate the tube, it gives rise to a uniform force directed substantially radially inward over the exterior surface of the tube. If this force is greater than the structural strength of the tube, the tube is crushed, as shown in FIGURE 2, thus preventing light from passing therethrough.

It can be seen that the time between the firing of the switch 16 and the closing of the shutter is the rise time, i.e., the time between the firing of the switch and the reaching of the peak value of the current in the solenoid, plus the time necessary for the field pressure to crush the tube. However, with a tube strong enough to withstand the magnetic field until the current has reached the peak value, and if the rise time is known, the closing speed of the shutter is determined only by the time required for the tube to crush, since the switch may be fired prior to the time that it is desired that the shutter begin closing.

The rise time in seconds is given by the following relation:

$$t_r = \frac{\pi}{2}\sqrt{LC} \qquad (1)$$

where:

$t_r$ = current rise time (in seconds)
$L$ = solenoid inductance (in henrys)
$C$ = capacitance of capacitor bank (in farads)

Thus, for any system, the rise time may be calculated, and the switch 16 fired prematurely by this amount of time so that the closing speed of the shutter is only determined by the tube-crushing time.

Assuming the peak strength of the magnetic field is much greater than the structural strength of the tube, i.e., the tube offers no appreciable structural resistance to the field, the following relation is used to calculate the crushing time of the tube:

$$t_c = \frac{4}{B}\sqrt{\pi m r} \qquad (2)$$

where:

$t_c$ = crushing time (in seconds)
$r$ = distance to the axis of the tube (in cms.)
$m$ = mass per unit surface area of the tube (in gms./cm.$^2$)
$B$ = magnetic induction of the field (in gauss)

Many embodiments of the present invention have been constructed and used. Although only one geometry, i.e., cylindrical, is shown in the drawings, any desired tube geometry is possible. For instance, in one optical system having a high-speed camera with a rectangular window, a rectangular tube, 2 inches by 4 inches, and made of seven wraps of one and one-half mil thick aluminum foil, was inserted in a rectangular solenoid made of twenty turns of No. 10 copper wire embedded in an epoxy plastic casing. This solenoid was connected in series through an ignitron switch to a capacitor bank having a total capacitance of 15 microfarads and charged to 10 kilovolts. When the ignitron switch was fired, 12 kiloamps were suddenly introduced into the solenoid. After a current rise time of approximately 20 microseconds, the tube was crushed in 15 microseconds, and thus prevented light from passing therethrough. To use this shutter again, the crushed tube is removed from the solenoid and discarded, and another rectangular tube is substituted therefor.

Other tube geometries, e.g., having oval cross sections, have been tired and have performed satisfactorily. In addition, using stronger magnetic fields and modest apertures, closing times of approximately 2 microseconds have been achieved.

As can be seen, for the invention, it is only necessary that the applied magnetic field produce a pressure having a magnitude and direction which will crush the desired tube geometry. Thus, while specific embodiments have been described, the scope of the invention should only be liimted by the following claims.

What is claimed is:

1. A light shutter comprising an electrically conductive tube in combination with means for providing a first rapidly changing magnetic field effective to induce eddy currents in said tube productive of a second magnetic field opposing the change in said first rapidly changing magnetic field to increase the magnetic flux density to a high value in a short time interval in the space between said means and said tube productive of a pressure of a predetermined direction and strength to transversely crush at least a portion of said tube.

2. In an optical system, an optical instrument in combination with a light shutter comprising an electrically conductive tube positioned longitudinally in the path of incoming light to said optical instrument, and means for providing a first rapidly changing magnetic field effective to induce eddy currents in said tube productive of a second magnetic field opposing the change in said first rapidly changing magnetic field to increase the magnetic flux density to a high value in a short time interval in the space between said means and said tube productive of a pressure having a predetermined direction and strength to transversely crush at least a portion of said tube sufficiently to prevent said light from passing therethrough.

3. In an optical system, an optical instrument in combination with a light shutter comprising an electrically conductive tube positioned longitudinally in the path of incoming light to said optical instrument, a solenoid disposed about a portion of said tube, and means connected to said solenoid for rapidly causing a high current in said solenoid productive of a magnetic field pressure having a predetermined strength and direction to transversely crush a portion of said tube sufficiently to prevent said light from passing therethrough.

4. In an optical system, light-detecting means in combination with a light shutter comprising a thin-walled metallic tube having a darkened interior surface and positioned longitudinally in the path of light to said light-detecting means, a solenoid disposed transversely about the central portion of said tube, and means connected to said solenoid for rapidly causing a high current in said solenoid productive of a magnetic-field pressure having a predetermined strength and direction to transversely crush a portion of said tube sufficiently to prevent light from passing therethrough.

5. In an optical system, a high-speed camera in combination with a light shutter comprising a tube of at least one wrap of aluminum foil having a darkened interior surface, said tube being positioned longitudinally in the path of incoming light to said camera, a solenoid having a cross section similar to the cross section of said tube, said solenoid being disposed transversely about the central portion of said tube, and means connected to said solenoid for rapidly causing a high current in said solenoid, said current being productive of a magnetic field pressure having a predetermined strength and direction to transversely crush said central portion of said tube.

6. The optical system of claim 5 wherein said tube has a cylindrical cross section.

7. The optical system of claim 5 wherein said tube has a rectangular cross section.

8. The optical system of claim 5 wherein said tube has an oval cross section.

References Cited by the Examiner
UNITED STATES PATENTS 1,934,519   11/33   Anderson _____ 95—58

NORTON ANSHER, *Primary Examiner.*

JOHN M. HORAN, *Examiner.*